United States Patent [19]
Heiter et al.

[11] 3,834,753
[45] Sept. 10, 1974

[54] COMBINATION BOAT AND UTILITY TRAILER STRUCTURE

[76] Inventors: Mary H. Heiter; Carl B. Heiter, Jr., both of 8906 Western Hills Rd., Kansas City, Mo. 64114

[22] Filed: Mar. 12, 1973

[21] Appl. No.: 340,268

[52] U.S. Cl............. 296/10, 280/34 A, 280/414 R, 296/27, 296/23 B, 296/52
[51] Int. Cl.......................... B62d 21/12, B60p 3/10
[58] Field of Search......... 280/414 R, 34 A; 296/10, 296/52, 27, 23 B

[56] References Cited
UNITED STATES PATENTS

| | | | |
|---|---|---|---|
| 1,299,381 | 4/1919 | Rankin | 296/10 |
| 1,403,307 | 1/1922 | Fisher | 296/10 |
| 2,720,413 | 10/1955 | Halverson | 296/10 |
| 2,876,036 | 3/1956 | Olson | 280/414 R X |
| 3,539,066 | 11/1970 | Stevenson | 280/414 R X |
| 3,584,753 | 6/1971 | Voeller | 296/23 B X |

*Primary Examiner*—David Schonberg
*Assistant Examiner*—Randall A. Schrecengost

[57] ABSTRACT

A trailer structure consisting primarily of a flat bed with a catwalk, the bed having hinged side boards for use when the device is used as a utility trailer, the ends of the side boards receiving removable panels, the side boards being supported by removable stakes.

3 Claims, 4 Drawing Figures

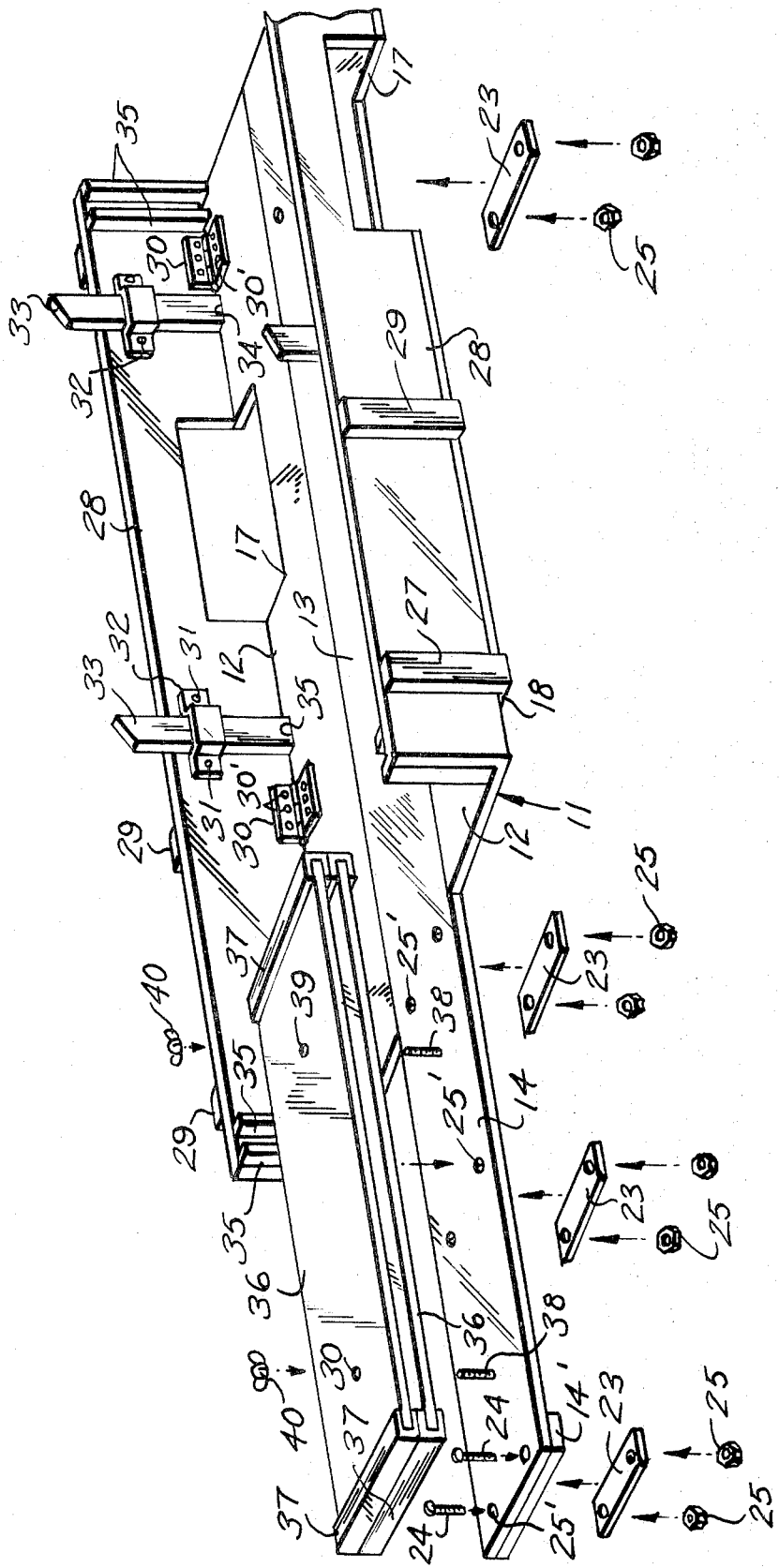

3,834,753

COMBINATION BOAT AND UTILITY TRAILER STRUCTURE

This invention relates to trailers and more particularly to a combination boat and utility trailer structure.

It is therefore the principal object of this invention to provide a combination boat and utility trailer structure which serves as a boat trailer when desired and will also serve as a practical and easily set up utility trailer for hauling purposes when desired.

Another object of this invention is to provide a trailer structure of the type described which will have a flat bed secured to a standard boat trailer axle, the central and forward portion being elongated so as to serve as a catwalk for easily and quickly loading a boat thereon.

Still another object of this invention is to provide a trailer structure of the type described which will have hinged sideboards which will fold inwards when the device is used to haul a boat, the sideboards being pivoted upwards and held in position by means of stakes received within brackets of the sideboards, the ends of the stakes being received within openings of the flat bed, thus effectively rendering the sideboards rigid for enabling the device to be used for hauling purposes.

Yet another object of the present invention is to provide a structure of the type described which will have removable end panels which will be received within rail members secured at the ends of the sideboards when the device is used for hauling purposes, the end panels being removed and secured by suitable fasteners to a catwalk portion when it is desired to lower or pivot the sideboards downwards after removing the stakes therefrom.

Other objects of the invention are to provide a utility and boat trailer structure which is simple in design, inexpensive to manufacture, rugged in construction, easy to use and efficient in operation.

These and other objects will be readily evident upon a study of the following specification and the accompanying drawings wherein:

FIG. 4 is a fragmentary, exploded perspective view, the view showing how the end panels may be secured to the catwalk portion of the structure.

Figure 2:
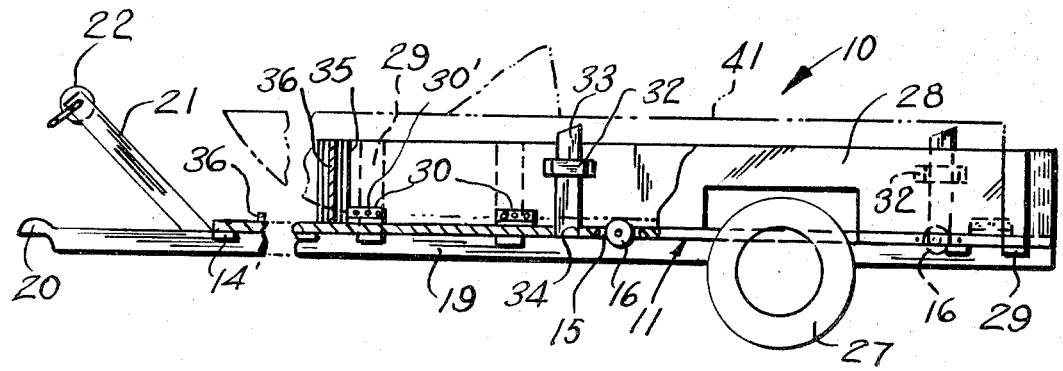
FIG. 2 is a side view of FIG. 1, shown in elevation and partly broken away.
Figure 1:
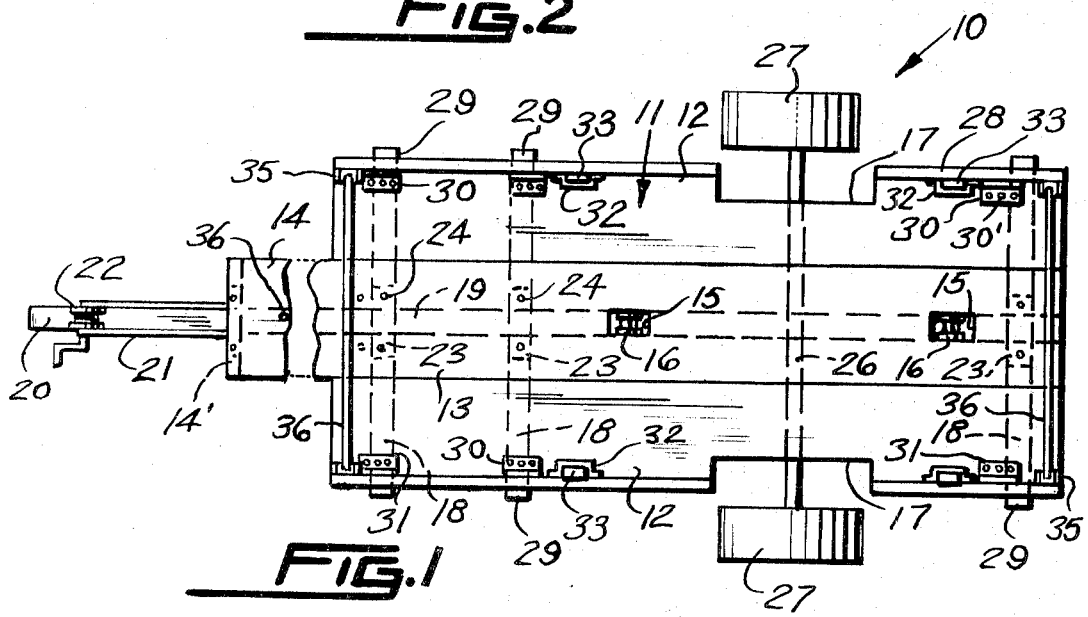
FIG. 1 is a top plan view of the present invention.
Figure 3:
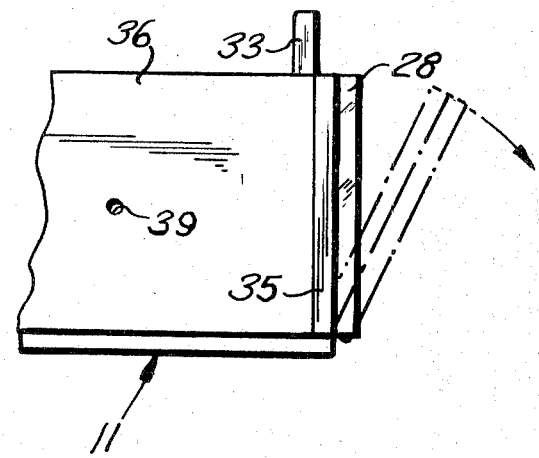
FIG. 3 is a fragmentary end view of the structure shown in elevation.

According to this invention, a trailer structure 10 is shown to consist of a flat bed 11 having a pair of elongated flat boards 12 abutting with and flanking an elongated center board 13. The center board 13 includes a forward extending portion 14 which serves as catwalk means for loading structure 10. The end of extension portion 14 is provided with a brace 14' which is secured thereto by means which hereinafter will be described.

The center board 13 is provided with a pair of spaced apart and aligned openings 15 of rectangular configuration in which are carried rotatably, each, a roller 16 for use when structure 10 is used to haul a boat.

Cut-out openings 17 of boards 12 and sideboards 28, provide a means for the placement of side rollers (not shown).

A plurality of spaced apart cross-bar members 18 of wood are fixedly secured to the underside of the bed 11 and are mounted to the beam 19 having a hitch portion 20. An angular support member 21 fixedly secured to beam 19 is provided with a manually operated winch 22 for manipulating a boat. A plurality of rectangular metal plates 23 are secured to bed 11 by means of bolt fasteners 24 and nut fasteners 25 which are carried within the openings 25' of the center board 13 and its extending portion 14.

A conventional boat trailer axle 26 is secured by suitable fasteners (not shown) to the bottom of bed 11 and axle 26 carries the wheels 27 which provide for rolling engagement of structure 10, with the ground surface.

A pair of hinged side boards 28 are provided with suitable braces 29 which are secured thereto in a suitable manner (not shown) so as to impart rigidity to sideboards 28. Sideboards 28 are provided with hinges 30 which are spaced apart and are secured thereto by means of suitable fasteners 30', the opposite ends of hinges 30 being similarly secured to boards 12 which flank and abut with the centerboard 13 of structure 10. A plurality of suitable fasteners 31 provide a means of securing a pair of brackets 32, to the sideboards 28. Brackets 32 provide a means for receiving removable wooden stakes 33 which are entered into openings 34 of boards 12 so as to hold sideboards 28 upwards when structure 10 is used for hauling purposes other than carrying a boat.

A pair of parallel spaced apart vertical members 35 are fixedly secured on the interior of structure 10 at each corner, the members 35 serving as rail means for receiving the ends of a panel 36. A metal channel 37 is fixedly secured in a suitable manner (not shown) to each end of the pair of panels 36 of structure 10 so as to enable them to be easily placed in and removed from between the members 35 of the sideboards 28.

It shall be noted that when sideboards 28 are placed in the upright position with the stakes 33 in place and the panels 36 received on the ends of the structure 10, the structure 10 is then used as transport means for hauling various articles. When structure 10 is used to haul boat 41, the stakes 33 are lifted upwards from the opening 34 and the sideboards 28 are pivoted downwards from their attached hinges 30. The panels 36 are removed from within the members 35 and are stacked together and placed upon the catwalk 14 so that the opening 39 align with threaded bolts 38, the bolts 38 then receive the wing nut fasteners 40 which serves to secure panels 36 in place when structure 10 is used for transporting boat 41.

It shall be noted further that the present structure 10 may be manufactured in kit form to fit conventional trailers or may be suitably manufactured intact on boat trailers.

What I now claim is:

1. A combination boat and utility trailer structure, comprising a flat bed having a central and extending catwalk portion, a pair of hinged side boards carried by said flat bed of said structure for forming side walls for such structure when it is used for hauling purposes other than a boat, hinge means carried by said flat bed providing pivoting means for said side boards, a pair of rectangular panels with channel ends, providing a means for closing off the ends of said structure to form a utility trailer for hauling purposes, cross brace members carried by said structure, providing ridigity therefore, and bolt and nut fastener means carried by said structure for supporting plates to said flat bed, bolt and wing nut fastener means carried by said structure providing a means for securing the pair of end walls to said structure when not in use as end wall members of said flat bed, roller means carried by said structure for ease of handling whatever is placed upon said flat bed of said structure, said flat bed of said structure including an elongated rectangular board member which abuts with a pair of flanking board members, one on either side, said cross brace members being secured fixedly to said side board members abutting with said central board member, a pair of spaced apart hinges secured to said board flanking said central board, said hinges being secured to said side boards which are pivotable upon said flat bed, said hinges being secured to said side boards and said boards flanking said central board by means of a plurality of fasteners, a pair of spaced apart brackets secured by suitable fastener means to one side of said side boards which are hingeable, said brackets being removeably receiving stake members, said stake members being received within openings in the boards flanking said central board of said flat bed of said structure, said hinged side boards and said boards flanking said central board providing an opening for roller means for aiding in moving a boat and the material being received on said flat bed of said structure, and said central bed member including roller means spaced apart therein and received within openings through said central board of said flat bed structure, said central board extending outwards at the forward end of said device so as to form catwalk means for hauling a boat aboard said flat bed when said structure is used for hauling a boat, said extension of said center board providing storage means for said end panels when said structure is used for hauling a boat, said end panel being stacked in parallel alignment with each other and placed upon bowl carried within said extending end of said center board, said bowls receiving winged nut fasteners which will render said panel secure on top of said extending portion of said center board.

2. The combination according to claim 1, wherein said end panels are secured, one to each end, in metal channel for protecting the ends and enabling said ends of said panels to be easily placed in and removed from parallel spaced apart vertical members secured fixedly to each corner of said structure at the ends of said hinged sideboards, the hinged sideboards and said end panels when erected form compartment means for said structure to be used for hauling purposes of various articles and said center board includes a crossbar portion at its extending catwalk portion end, said center board also receiving said metal plates which are secured thereto by means of suitable bolt and nut fasteners thus providing a rigid structure for said flat bed, said flat bed having axle means and wheel means for supporting it upon the ground.

3. The combination according to claim 2, wherein vertical brace members are secured fixedly to said pivotable side walls so as to provide maximum rigidity for said side walls, and said side walls fold inwards on said hinges when said stakes are removed from said brackets of said side walls thus enabling said structure to form support and guide means for a boat when said end panels are removed from said ends of said structure.

* * * * *